United States Patent
Lee et al.

(10) Patent No.: US 10,394,282 B2
(45) Date of Patent: Aug. 27, 2019

(54) FOLDABLE ELECTRONIC DEVICE

(71) Applicant: SAMSUNG ELECTRONICS CO., LTD., Suwon-si (KR)

(72) Inventors: Ga-eun Lee, Suwon-si (KR); Hee-seok Jeong, Suwon-si (KR); Kyung-wan Park, Suwon-si (KR); Yong-jun Lim, Seoul (KR); Shi-yun Cho, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 428 days.

(21) Appl. No.: 14/830,853

(22) Filed: Aug. 20, 2015

(65) Prior Publication Data

US 2016/0062408 A1 Mar. 3, 2016

(30) Foreign Application Priority Data

Aug. 28, 2014 (KR) .................. 10-2014-0113345

(51) Int. Cl.
*G06F 1/16* (2006.01)
*G06F 3/14* (2006.01)

(52) U.S. Cl.
CPC .......... *G06F 1/1641* (2013.01); *G06F 1/1616* (2013.01); *G06F 1/1618* (2013.01); *G06F 1/1626* (2013.01); *G06F 1/1652* (2013.01); *G06F 1/1677* (2013.01); *G06F 1/1681* (2013.01); *G06F 3/14* (2013.01); *G06F 2203/04102* (2013.01)

(58) Field of Classification Search
CPC .... G06F 1/1641; G06F 1/1652; G06F 1/1681; G06F 3/041; G06F 2203/04102
See application file for complete search history.

(56) References Cited

U.S. PATENT DOCUMENTS

| | | | |
|---|---|---|---|
| 6,344,846 B1 * | 2/2002 | Hines | G06F 3/0312 345/156 |
| 7,830,333 B2 * | 11/2010 | Aoki | G06F 1/1601 345/1.3 |
| 2005/0041012 A1 * | 2/2005 | Daniel | G06F 1/1601 345/156 |
| 2006/0146488 A1 * | 7/2006 | Kimmel | G06F 1/1616 361/679.04 |

(Continued)

FOREIGN PATENT DOCUMENTS

KR  101320384 B1  10/2013

*Primary Examiner* — Antonio Xavier
(74) *Attorney, Agent, or Firm* — Sughrue Mion, PLLC

(57) ABSTRACT

A foldable electronic device including: a first body; a second body; a connection part configured to connect the first body to the second body so that the first body and the second body are rotatable to a first state in which the first and second bodies are unfolded and to a second state in which the first and second bodies overlap each other; a flexible display element that passes over the connection part and is supported by the first and second bodies; and a roller that is rotatably installed at an end of the first body and connected to an end of the flexible display element, wherein the flexible display element is located at an outer circumference of the first body, the second body, and the connection part in the second state, and wherein a part of the flexible display element is rolled around the roller in the first state.

11 Claims, 8 Drawing Sheets

(56) References Cited

U.S. PATENT DOCUMENTS

| | | | |
|---|---|---|---|
| 2009/0231307 A1* | 9/2009 | Lee | G06F 1/1601 345/184 |
| 2010/0064244 A1* | 3/2010 | Kilpatrick, II | G06F 1/1616 715/773 |
| 2010/0134873 A1* | 6/2010 | van Lieshout | G02F 1/133305 359/296 |
| 2011/0188189 A1* | 8/2011 | Park | G05B 11/01 361/679.05 |
| 2012/0019482 A1* | 1/2012 | Wang | G06F 1/1652 345/175 |
| 2012/0033353 A1* | 2/2012 | Huang | G09F 9/33 361/679.01 |
| 2012/0120480 A1* | 5/2012 | van Lieshout | G02F 1/133305 359/296 |
| 2012/0306910 A1* | 12/2012 | Kim | H04N 13/04 345/619 |
| 2013/0010405 A1* | 1/2013 | Rothkopf | H04M 1/0216 361/679.01 |
| 2013/0021762 A1* | 1/2013 | van Dijk | G06F 1/1652 361/749 |
| 2013/0201208 A1* | 8/2013 | Cho | G06F 3/1431 345/619 |
| 2013/0334981 A1* | 12/2013 | Kwack | H05B 37/02 315/291 |
| 2014/0009419 A1* | 1/2014 | Kim | G06F 3/0412 345/173 |
| 2014/0028597 A1* | 1/2014 | Cho | G06F 3/0487 345/173 |
| 2014/0196254 A1* | 7/2014 | Song | E05D 3/14 16/302 |
| 2014/0247405 A1 | 9/2014 | Jin et al. | |
| 2014/0247544 A1* | 9/2014 | Ryu | G09F 11/18 361/679.01 |
| 2015/0009636 A1* | 1/2015 | Jeong | B65H 18/10 361/749 |
| 2015/0029229 A1* | 1/2015 | Voutsas | G06F 1/1652 345/661 |
| 2015/0129122 A1* | 5/2015 | Kim | H01L 51/003 156/249 |
| 2015/0220118 A1* | 8/2015 | Kwak | G06F 3/14 345/667 |
| 2015/0220119 A1* | 8/2015 | Seo | G06F 3/041 345/173 |
| 2015/0378397 A1* | 12/2015 | Park | G06F 1/1652 361/679.27 |
| 2016/0034000 A1* | 2/2016 | Lee | G06F 1/1652 361/749 |
| 2016/0266611 A1* | 9/2016 | Wang | G06F 3/01 |
| 2017/0160899 A1* | 6/2017 | Seo | G06F 3/041 |

\* cited by examiner

FOLDABLE ELECTRONIC DEVICE

CROSS-REFERENCE TO RELATED APPLICATION

This application claims the benefit of Korean Patent Application No. 10-2014-0113345, filed on Aug. 28, 2014, in the Korean Intellectual Property Office, the disclosure of which is incorporated herein in its entirety by reference.

BACKGROUND

1. Field

Aspects of one or more exemplary embodiments relate to a foldable electronic device, and more particularly, to a foldable mobile device including a flexible display element.

2. Description of the Related Art

An electronic device that may be carried (hereinafter, a portable device), such as a communication terminal, a game machine, a multimedia device, a portable computer, or a photographing apparatus, includes a display element for displaying image information or an input unit such as a keypad. A folding structure that allows a device to be folded has been applied to a small portable device such as a cellular phone or a personal digital assistant (PDA) to increase portability. A portable device may have two bodies connected using the folding structure. However, even though there is a demand for a large display element, since a display element in the related art does not have a bendable structure, it has been difficult to apply a large display element to a small portable device having a folding structure.

As a flexible display element that may be bent has been developed, efforts to apply the flexible display element to a portable device having a folding structure are being made. If a flexible display element is applied to a portable device having a folding structure, since the flexible display element may be integrally disposed with the folding structure and cover two bodies of the portable device, a large screen may be provided in the portable device.

If a portable device having a certain thickness is folded or unfolded, a flexible display element may not cover a whole surface of the portable device due to a difference between a surface area of the foldable device and a surface area of the flexible display element, which may occur due to a connection part of the two bodies, and a curvature of a folded or unfolded part of the flexible display element may not be constant.

SUMMARY

One or more exemplary embodiments include a foldable electronic device which includes a flexible display element that may cover a whole display area including an area of a connection part, wherein the foldable electronic device may be folded so that the flexible display element is bent at an outer surface of the foldable electronic device.

One or more exemplary embodiments include a foldable electronic device that includes a flexible display element which may be folded up to a certain curvature when the foldable electronic device is folded or unfolded.

Additional aspects will be set forth in part in the description which follows and, in part, will be apparent from the description, or may be learned by practice of one or more exemplary embodiments.

According to aspects of one or more exemplary embodiments, there is provided a foldable electronic device including: a first body; a second body; a connection part configured to connect the first body to the second body so that the first body and the second body are rotatable to a first state in which the first and second bodies are unfolded and to a second state in which the first and second bodies overlap each other; a flexible display element that passes over the connection part and is supported by the first and second bodies; and a roller that is rotatably installed at an end of the first body and connected to an end of the flexible display element, wherein the flexible display element is located at an outer circumference of the first body, the second body, and the connection part in the second state, and wherein a part of the flexible display element is rolled around the roller in the first state.

The flexible display element may be fixed to the second body.

The connection part may include: a first shaft supported so that the first body may be rotated; a second shaft supported so that the second body may be rotated; a first gear centered at the first shaft; and a second gear centered at the second shaft.

The first gear and the second gear may be respectively disposed in the first body and the second body so that the first gear and the second gear to interlock with each other.

The foldable electronic device may further include a slider attached to the flexible display element and installed to slide in the first body in a folding direction.

The foldable electronic device may further include: a sensor configured to detect an angular displacement of the roller; and a controller configured to receive a detection signal from the sensor, and to determine a display area of the flexible display element in the first state or the second state.

The controller may be further configured to drive the determined display area the flexible display element, and to not drive an area of the flexible display element rolled around the roller.

According to aspects of one or more exemplary embodiments, there is provided a foldable electronic device including: a first body; a second body; a connection part configured to connect the first body to the second body so that the first body and the second body are rotatable into a first state in which the first and second bodies are unfolded and into a second state in which the first and second bodies overlap each other; a flexible display element that passes over the connection part and is supported by the first and second bodies; a first roller rotatably installed at an end of the first body and connected to a first end of the flexible display element; and a second roller rotatably installed at an end of the second body and connected to a second end of the flexible display element, wherein the flexible display element is located at an outer circumference of the first body, the second body, and the connection part in the second state, and wherein a part of the flexible display element is rolled around the first roller and the second roller in the first state.

The connection part may include: a first shaft supported so that the first body may be rotated; a second shaft supported so that the second body may be rotated; a first gear centered at the first shaft; and a second gear centered at the second shaft.

The first gear and the second gear may be respectively disposed in the first body and the second body so that the first gear and the second gear to interlock with each other.

The foldable electronic device may further include: a first elastic member configured to apply a first elastic force to the first roller, so that parts of the flexible display element roll around the first roller; and a second elastic member configured to apply a second elastic force to the second roller, so that parts of the flexible display element roll around the second roller.

A magnitude of the first elastic force may be substantially similar to a magnitude of the second elastic force.

The foldable electronic device may further include a slider attached to the flexible display element and installed to slide in the first body and the second body in folding directions.

The foldable electronic device may further include: a sensor configured to detect an angular displacement of the first roller and an angular displacement of the second roller; and a controller configured to receive a detection signal from the sensor, and to determine a display area of the flexible display element in the first state or the second state.

The controller may be further configured to drive the determined display area of the flexible display element, and to not drive areas of the flexible display element rolled around the first roller and the second roller.

According to aspects of one or more exemplary embodiments, there is provided a foldable electronic device including: a first body; a second body; a connector connecting the first body to the second body; a flexible display disposed covering the connector and supported by a front surface of the first body and a front surface the second body; and a roller installed at an end of the first body and connected to an end of the flexible display, wherein the first body and the second body are configured to be rotated into an unfolded state in which the first body and the second body are substantially planar and to be rotated into a folded state in which the first and second bodies overlap, wherein a portion of the flexible display is rolled around the roller in the unfolded state, and wherein the flexible display is disposed on an outer circumference of the first body, the second body, and the connector in the folded state.

The foldable electronic device may further include: a sensor configured to detect an angular displacement of the roller; and a controller configured to determine a display area of the flexible display based on the detected angular displacement.

The controller may be further configured to determine whether the foldable electronic device is in the unfolded state or in the folded state based on the detected angular displacement.

The controller may be further configured to determine that the display area corresponds to an area of the flexible display supported by the front surface of the first body and an area of the flexible display supported by the front surface of the second body.

The controller may be further configured to determine that the display area does not include a rolled area of the flexible display rolled around the roller.

The controller may be further configured to determine that the display area does not include, while the foldable electronic device is in the second state, a curved area of the flexible display spanning between the first body and the second body.

The foldable electronic device may further include an elastic member configured to apply a first elastic force to the roller, so that parts of the flexible display element roll around the roller in the unfolded state.

BRIEF DESCRIPTION OF THE DRAWINGS

These and/or other aspects will become apparent and more readily appreciated from the following description of certain exemplary embodiments, taken in conjunction with the accompanying drawings in which.

DETAILED DESCRIPTION

Figure 1:
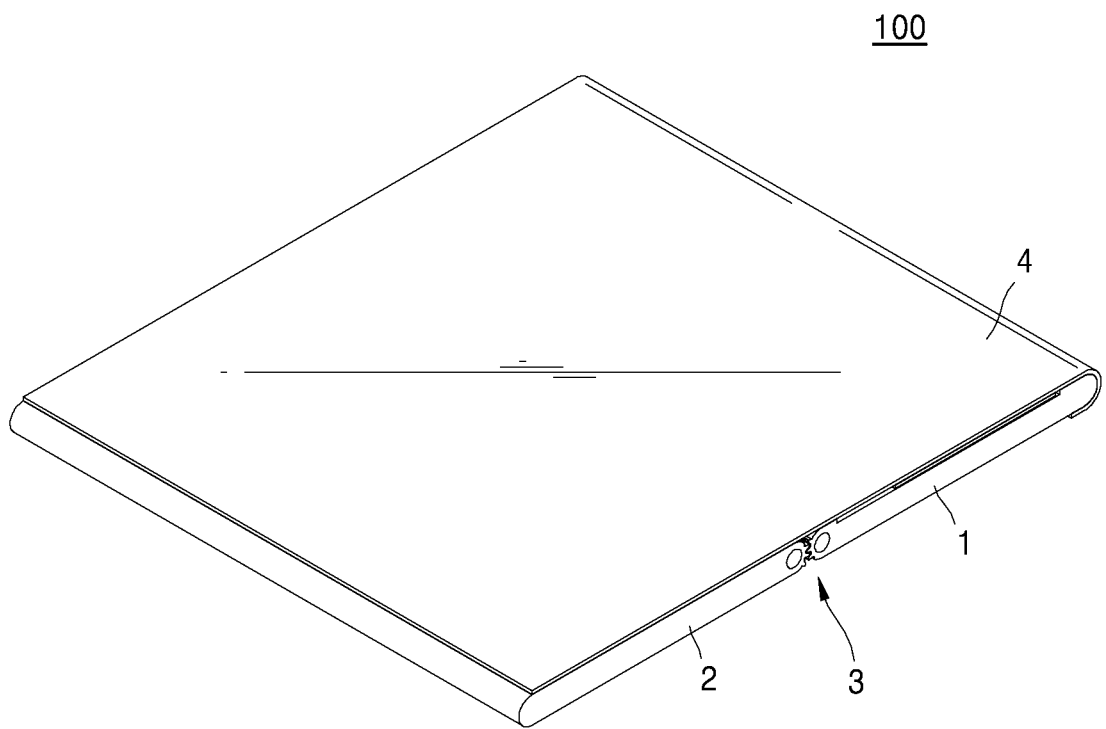
FIGS. 1 and 2 respectively illustrate a perspective view of an assembled foldable electronic device and an exploded perspective view of the foldable electronic device, according to an exemplary embodiment.

Reference will now be made in detail to one or more exemplary embodiments, examples of which are illustrated in the accompanying drawings, wherein like reference numerals refer to like elements throughout. In this regard, one or more exemplary embodiments may have different forms and should not be construed as being limited to the descriptions set forth herein. The exemplary embodiments described below are merely to explain certain aspects of one or more exemplary embodiments. As used herein, the term "and/or" includes any and all combinations of one or more of the associated listed items. Expressions such as "at least one of," when preceding a list of elements, modify the entire list of elements and do not modify the individual elements of the list.

Hereinafter, one or more exemplary embodiments will be described more fully with reference to the accompanying drawings. A foldable electronic device will be described in detail with reference to the accompanying drawings, according to one or more exemplary embodiments. Like reference numerals or symbols denote parts or elements which perform substantially the same functions.

While terms that include an ordinal number such as "first," "second," etc., may be used to describe various components, such components must not be limited to the above terms. The above terms are used only to distinguish one component from another. For example, a first element may be referred to as a second element, and, similarly, a second element may be referred to as a first element without departing from the scope of the invention.

The terminology used herein is for the purpose of describing particular exemplary embodiments only and is not intended to be limiting of the inventive concept. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups. Like reference numerals denote members which perform substantially the same functions.

Figure 2:
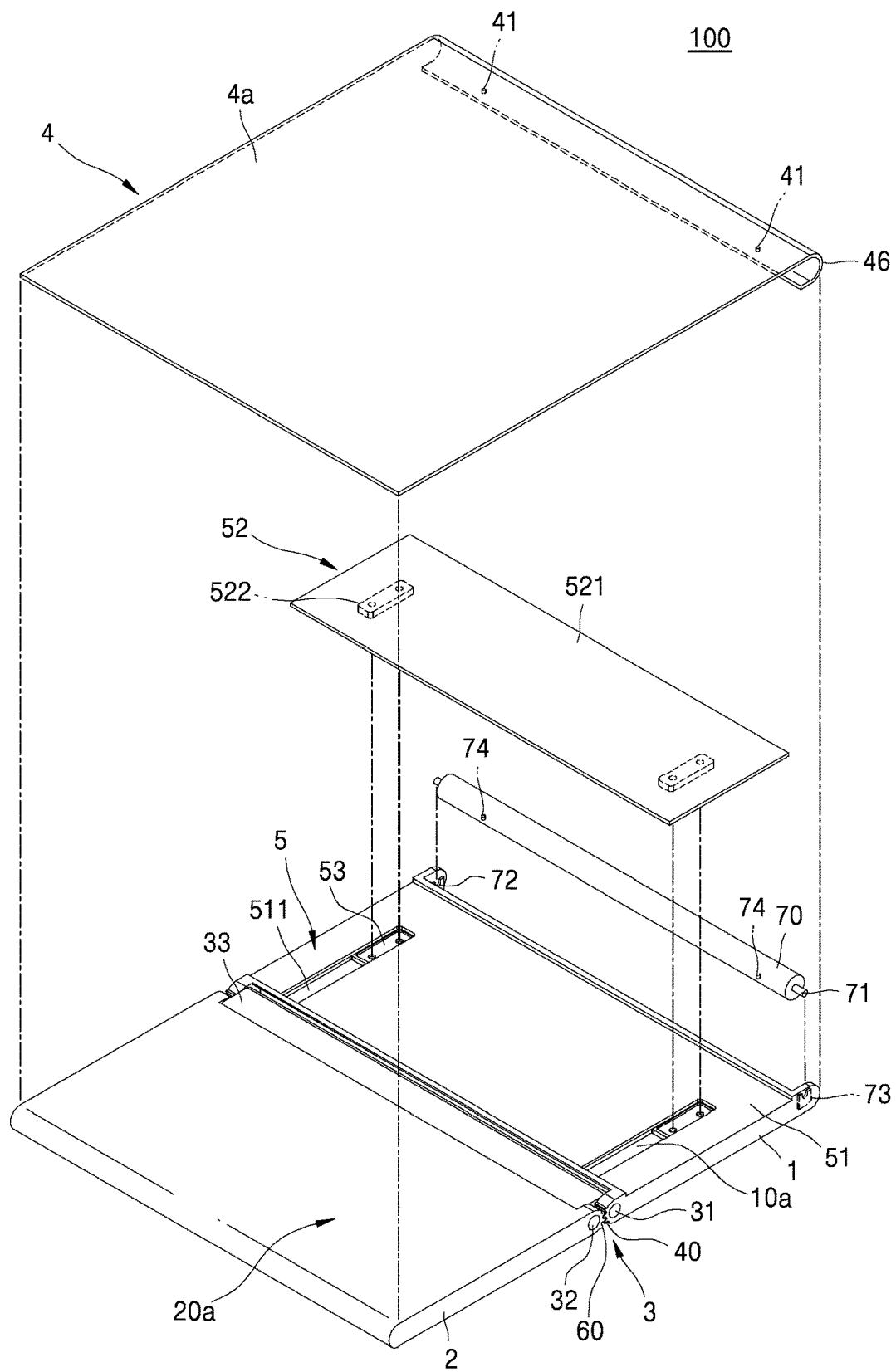

FIGS. 1 and 2 respectively illustrate a perspective view of a foldable electronic device 100 and an exploded perspective view of the foldable electronic device 100, according to an exemplary embodiment.

Referring to FIGS. 1 and 2, the foldable electronic device 100 includes first and second bodies 1 and 2, a connection part 3, e.g., a connector, and a flexible display element 4, e.g., a flexible display. The flexible display element 4 is supported by the first body 1 and the second body 2. The connection part 3 connects the first body 1 to the second body 2 so that the first body 1 and the second body 2 may be folded.

The foldable electronic device 100 may be a mobile device that may be carried, such as a communication terminal, a game machine, a multimedia device, a portable computer, a photographing apparatus, or the like.

The first and second bodies 1 and 2 may include a processor, e.g., a processing unit, and an interface, e.g., an input/output unit or an input/output interface, for performing a function according to a use of the foldable electronic device 100. If the foldable device 100 is a multimedia terminal that allows viewing of images or listening to music, the processor may include a video/sound information processor. If the foldable electronic device 100 is a communication terminal, the processor may include a communication module. The interface may include a video/audio interface and a user interface, e.g., a manipulation unit, for user manipulation. The user interface may be implemented as a touch panel that is integrated into the flexible display element 4.

The first body 1 may have a shape corresponding to that of the second body 2. The first and second bodies 1 and 2 may have a similar size and shape.

At least a part of the flexible display element 4 may be bent within a range of a minimum bending radius that may be allowed for a thin-film transistor (TFT) array disposed in an active matrix organic light-emitting diode (AMOLED) flexible display. The flexible display element 4 may provide certain information to a user or receive an input of certain information from the user.

The flexible display element 4 passes over the connection part 3, and, thus, is supported by respective surfaces 10a and 20a of the first and second bodies 1 and 2. For example, the flexible display element 4 may be bonded to the first and second bodies 1 and 2 using an adhesive element such as an adhesive or a double-sided tape. The flexible display element 4 is not fixed to the connection part 3. When the foldable electronic device 100 is folded, the first and second bodies 1 and 2 overlap each other, and the flexible display element 4 is located at an outer circumference of the first and second bodies 1 and 2 and the connection part 3.

The connection part 3 may include a pair of first and second gears 40 and 60, e.g., first and second gear units, which are respectively disposed in the first body 1 and the second body 2. The first and second gears 40 and 60 may interlock with each other.

The connection part 3 may include two hinge axes. The connection part 3 may include a first shaft 31 disposed in the first body 1 and a second shaft 32 disposed in a second body 2. The second shaft 32 is disposed in parallel with the first shaft 31. The second shaft 32 may be separate from the first shaft 31 in a direction perpendicular to a length of the second shaft 32. The connection part 3 may include a housing 33 for protecting the first shaft 31 and the second shaft 32. However, a structure of the connection part 3 is not limited thereto, and may be variously modified to have a structure in which the first body 1 and the second body 2 may be rotatably moved.

The first shaft 31 and the second shaft 32 are at respective center axes of rotation of the first and second gears 40 and 60. Multiple pairs of the first and second gears 40 and 60 may be disposed to correspond to each other in a direction of a length of the first shaft 31 and the second shaft 32.

A sliding module 5 is disposed between the flexible display element 4 and the first body 1 and, while the first body 1 and the second 2 are being bent, may move the flexible display element 4 with respect to the first body 1.

The sliding module 5 may have various structures. For example, the sliding module 5 may include a base 51 that is mounted in the first body 1, and a slider 52, e.g., a sliding unit, that may be slid, and, thus, moved with respect to the base 51. The slider 52 is bonded to a part of the flexible display element 4. The base 51 includes a guide part 511 into which the slider 52 may be inserted. The slider 52 may include an attachment part 521 that is attached to the flexible display element 4, and an insertion part 522 that is inserted into the guide 511.

The sliding module 5 may further include a separation preventer 53, e.g., a separation prevention unit, that is combined with the insertion part 522 to prevent the insertion part 522 from separating from the guide part 511.

A roller 70, e.g., a roller unit, is disposed at an end of the first body 1 and may roll a second area 4b (shown in FIG. 3) of the flexible display element 4. For example, the roller 70 may rotate around a rotation axis 71. Ends of the roller 70 71 are supported by the first and second members 72 and 73. A plurality of concave parts 74 are formed on a surface of the roller 70, and a plurality of protruding parts 41 that may be inserted into the plurality of concave parts 74 are formed on a surface of the second area 4b, so that the flexible display element 4 may be fixed to the roller 70.

Figure 3:
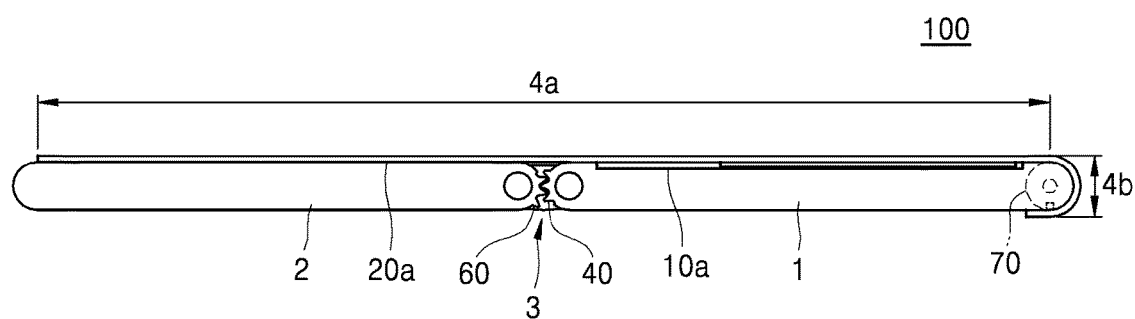
FIGS. 3 and 4 respectively illustrate side views of a foldable electronic device in an unfolded state and in a folded state, according to an exemplary embodiment.
Figure 4:
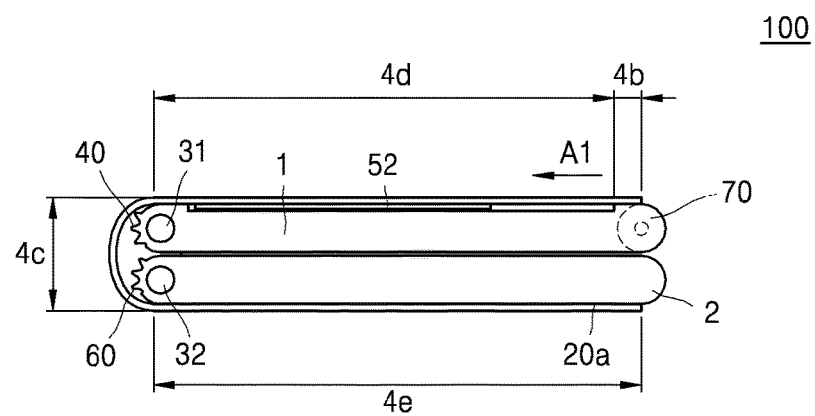

FIGS. 3 and 4 illustrate side views of a first state in which the foldable electronic device 100 is unfolded and a second state in which the foldable electronic device 100 is folded, according to an exemplary embodiment.

Referring to FIG. 3, in the first state in which the foldable electronic device 100 is unfolded, the first body 1 and the second body 2 are disposed on a same plane. A first area 4a of the flexible display element 4 is unfolded and supported by a surface 10a of the first body 1 and a surface 20a of the second body 2, and, thus, cover both the surfaces 10a and 20a of the first and second bodies 1 and 2. The second area 4b of the flexible display element 4 may be disposed to be rolled around the roller 70. Accordingly, a user may use the first area 4a of the flexible display element 4 as a display area of the foldable electronic device 100 in the first state.

Referring to FIG. 4, in the second state in which the foldable electronic device 100 is folded, the first body 1 and the second body 2 overlap to face each other. A user may rotatably move the first and second bodies 1 and 2 around the first and second shafts 31 and 32 so as to ensure convenience in portability by minimizing a surface area of the foldable electronic device 100. Since the first and second gears 40 and 60 disposed in a direction of a length of the first and second shafts 31 and 32 are formed to interlock with each other, an angular displacement of the first body 1 may match an angular displacement of the second body 2 while the foldable electronic device is changed from the first state to the second state. Accordingly, while the foldable electronic device 100 is changed from the first state to the second state, a curvature of a third area 4c of the flexible display element 4 may be maintained within a range of a minimum bending radius by the first and second gears 40 and 60.

As the foldable electronic device 100 is changed from the first state to the second state, the foldable electronic device 100 is folded, and, thus, the flexible display element 4 is moved in a direction of A1 with respect to the first body 1. Since a fifth area 4e of the flexible display element 4 is fixed to the surface 20a of the second body 2, the fifth area 43 of the flexible display element 4 may not be moved. Since the slider 52 shown in FIG. 2 may slide along a guide part 511 shown in FIG. 2 and a fourth area 4d of the flexible display element 4 is fixed to the slider 52, as the foldable electronic device 100 is folded, the slider 52 is moved in a folding direction, that is, in the direction of A1, and the fourth area 4d fixed to the slider 52 and the second area 4b may also be moved in the direction of A1 along the guide part 511.

As the fourth area 4d is moved in the direction of A1 along the guide part 511, the second area 4b rolled around the roller 70 may be also moved in the direction of A1, and, thus, cover the surface 10a of the first body 1. Accordingly, since the flexible display element 4 may cover both display areas of the first and second bodies 1 and 2 even when the foldable electronic device 100 is folded, a large screen may be provided to the user.

Figure 5A:
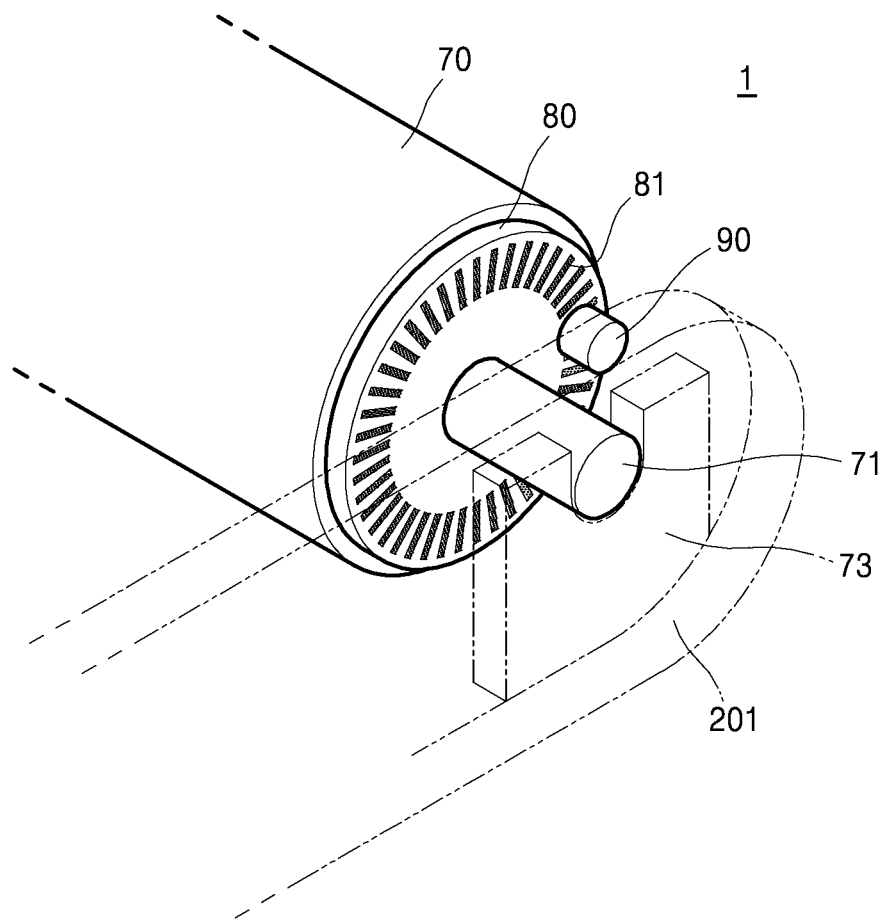
FIG. 5A illustrates a perspective view of a foldable electronic device in which a sensor is disposed, according to an exemplary embodiment.
Figure 5B:
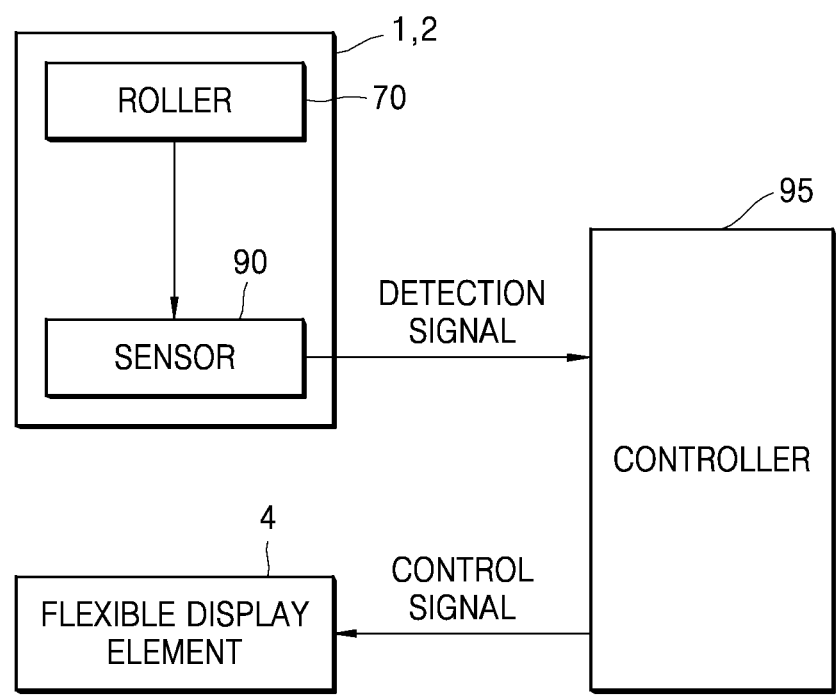
FIG. 5B illustrates a block diagram of a foldable electronic device that includes the sensor and a controller, according to an exemplary embodiment.

FIG. 5A illustrates a perspective view of a part of the first body 1 in which a rotation plate 80 is disposed in the roller 70. FIG. 5B illustrates a block diagram for explaining a process of determining a display area of the flexible display element 4 according to a rotation displacement sensed by a sensor 90, e.g., a sensor unit.

Referring to FIG. 5A, the rotation plate 80 is disposed between the roller 70 and an outer wall portion 201. The rotation plate 80 is fixed to the roller 70, and, thus, is rotated together with the roller 70. A location detection member 81 may be disposed at a surface of the rotation plate 80. The location detection member 81 is an element that may transmit a location signal to the sensor 90, described below, as the rotation plate 80 rotates. The location detection member 81 may be formed of, for example, a reflection plate or a permanent magnet.

The sensor 90 functions to detect a rotation displacement of the rotation plate 80 by using a signal received from the location detection member 81. The sensor 80 may include, as non-limiting examples, a magnetic encoder or an optical encoder. The sensor 90 may be a magnetic encoder that includes a magnetic flux sensor, and the location detection member 81 may be a plurality of permanent magnets disposed at a same pitch in a direction of a circumference of the roller plate 80. The magnetic flux sensor may detect magnetic flux interlinkage of a permanent magnet, which changes as the rotation plate 80 is rotated, and, thus, output the magnetic flux interlinkage as an electrical signal. The magnetic flux interlinkage of the permanent magnet may change regularly and predictably. According to an exemplary embodiment, the magnetic flux sensor may be, for example, a Hall sensor or a magneto resistive (MR) sensor.

As the roller 70 is rotated about the rotation axis 71, the rotation plate 80 fixed on the roller 70 is also rotated. Then, as magnetic flux interlinkage is detected to be changed by the location detection element 81, a detection signal is generated. Then, the sensor 90, detects the detection signal. Thus, an angular displacement of the rotation plate 80 and the roller 70 may be detected.

A plurality of sensors 90 may be employed to detect a rotation direction or improve a precision (a resolving power) of the detection. A number of the sensors 90 disposed on the foldable electronic device 100 may be determined according to various constraints, such as, as non-limiting examples, a manufacturing cost or desired precision.

Referring to FIG. 5B, an angular displacement of the roller 70 may be detected by the sensor 90, and a detection signal detected by the sensor 90 is transmitted to a controller 95, e.g., a control unit. The controller 95 may determine a location of the flexible display element 4 to be in the first state or in the second state according to the transmitted detection signal. The controller 95 determines a display area of the flexible display element 4 according to a location of the flexible display element 4. For example, the controller 95 displays an image by driving only the first area 4a of the flexible display element 4 in the first state in which the foldable electronic device 100 is unfolded, and displays an image by driving both the first area 4a and the second area 4b of the flexible display element 4 in the second state in which the foldable electronic device 100 is folded.

Figure 6:
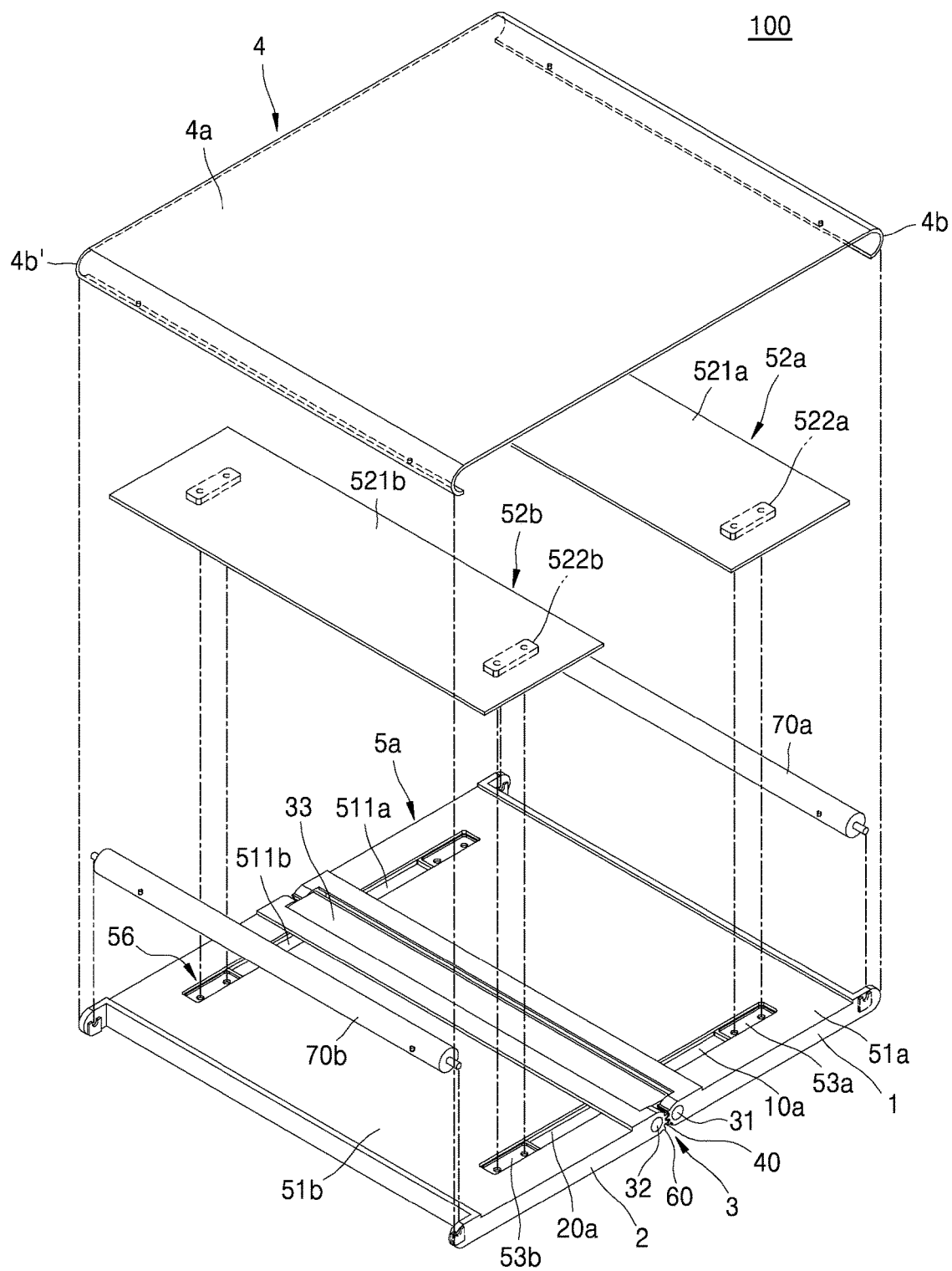
FIG. 6 illustrates an exploded perspective view of a foldable electronic device according to another exemplary embodiment.

FIG. 6 illustrates an exploded perspective view of the foldable electronic device 100 according to another exemplary embodiment.

Referring to FIG. 6, first and second sliding modules 5a and 5b are symmetrically disposed between the flexible display element 4 and the first and second bodies 1 and 2, and move the flexible display element 4 with respect to the first and second bodies 1 and 2 while the first and second bodies 1 and 2 are folded. The first and second rollers 70a and 70b may be respectively disposed at an end of the first body 1 and an end of the second body 2, and respectively roll second areas 4b and 4b' of the flexible display element 4.

Detailed configurations of the first and second sliding modules 5a and 5b and the first and second rollers 70a and 70b may be substantially identical to those of the sliding module 5 and the roller 70.

Figure 7A:
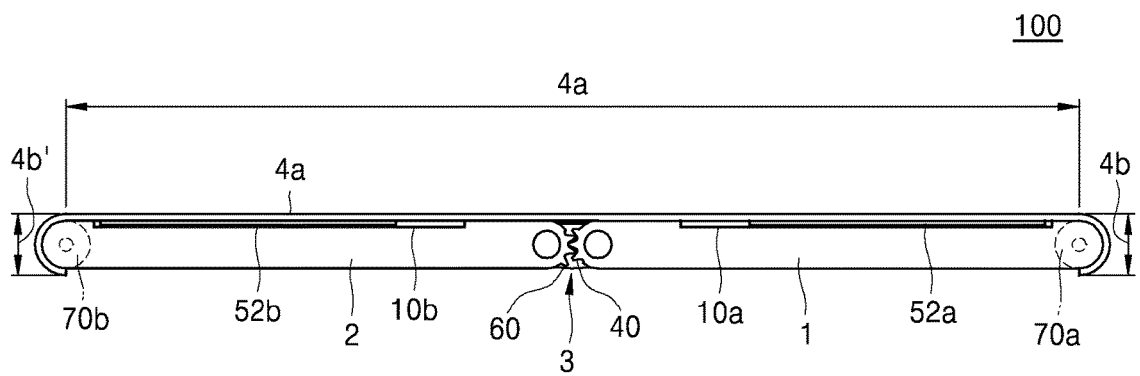
FIGS. 7A and 7B respectively illustrate side views of a foldable electronic device in an unfolded state and in a folded state, according to an exemplary embodiment.
Figure 7B:
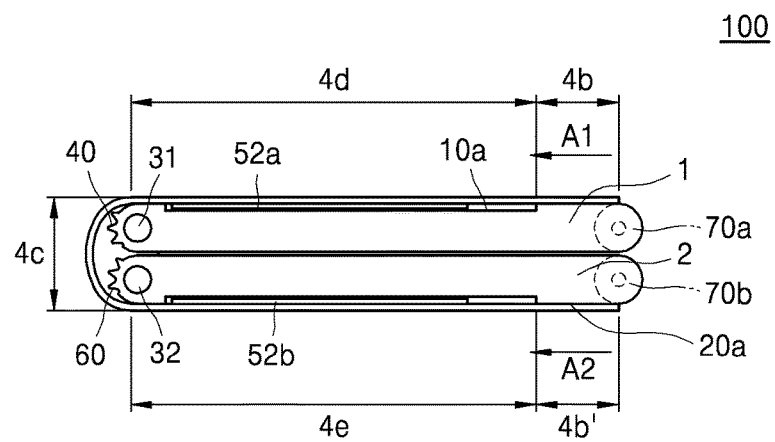

FIGS. 7A and 7B illustrate side views of a first state in which the foldable electronic device 100 is folded and a second state in which the foldable electronic device 100 is unfolded, according to another exemplary embodiment.

Referring to FIGS. 6 and 7A, in the first state in which the foldable electronic device 100 is unfolded, the first area 4a of the flexible display element 4 is disposed to be bonded to first and second sliders 52a and 52b and supported by the surfaces 10a and 20a of the first and second bodies 1 and 2, and, thus, covers the surfaces 10a and 20a of the first and second bodies 1 and 2, and the connection part 3. The second areas 4b and 4b' of the flexible display element 4 are respectively rolled around the first and second rollers 70a and 70b.

Referring to FIGS. 6 and 7B, the first body 1 and the second body 2 overlap to face each other in the second state in which the first body 1 and the second body 2 of the flexible electronic device 100 are folded. As described above with reference to FIG. 4, the first and second bodies 1 and 2 may be rotatably moved around the first and second shafts 31 and 32 so as to ensure convenience in portability of the foldable electronic device 100. The first and second gears 40 and 60 disposed in a lengthwise direction of the first and second shafts 31 and 32 may be formed to interlock with each other, and an angular displacement of the first body 1 may match an angular displacement of the second body 2 while the first state is changed to the second state. A curvature of the third area 4c of the flexible display element 4 may be maintained within a range of a minimum bending radius.

As the foldable electronic device 100 is changed from the first state to the second state, while the foldable electronic device 100 is being folded, the first and second sliders 52a and 52*b* shown in FIG. 6 may slide along the first and second guide parts 511*a* and 511*b* shown in FIG. 6. The fourth and fifth areas 4*d* and 4*e*, which are fixed to the first and second sliders 52*a* and 52*b*, are also moved along the first and second guide parts 511*a* and 511*b* in folding directions, that is, in respective directions of A1 and A2. Accordingly, the second area 4*b* and the fourth area 4*d* of the flexible display element 4 are moved in the direction of A1 with respect to the first body 1, and the second area 4*b'* and the fifth area 4*e* of the flexible display element 4 are moved in the direction of A2 with respect to the second body 2. Since the flexible display element 4 may respectively cover display areas of the first and second bodies 1 and 2 when movement of the flexible display element 4 is in the second state, a user may be provided with a large screen.

Figure 8A:
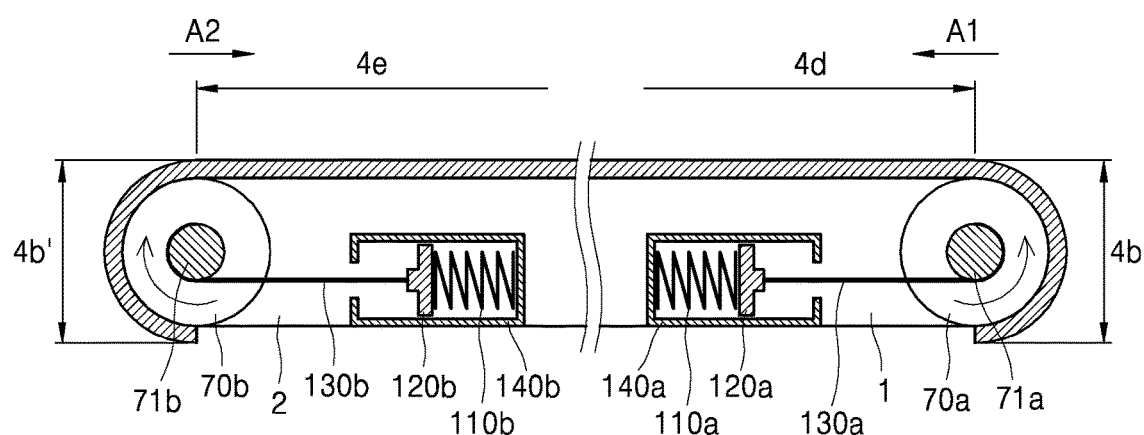
FIGS. 8A and 8B respectively illustrate cross-sectional views of the foldable electronic device including an elastic member in an unfolded state and in a folded state, according to an exemplary embodiment.
Figure 8B:
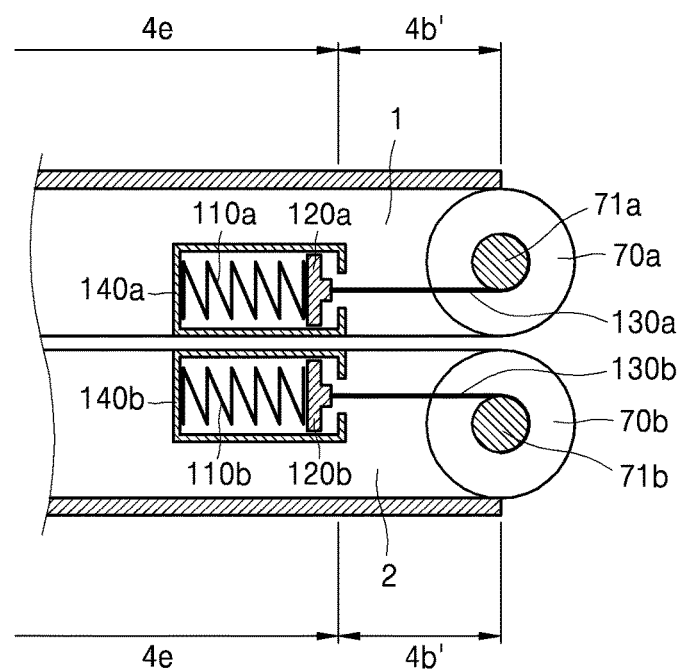

FIGS. 8A and 8B respectively illustrate cross-sectional views of parts of the foldable electronic device 100 in which the roller 70 is connected to an elastic member 110.

As described above, as the foldable electronic device 100 is changed from the first state to the second state, the second area 4*b* and the fourth area 4*d* of the flexible display element 4, and the second area 4*b'* and the fifth area 4*e* of the flexible display element 4 are respectively moved in the directions of A1 and A2. A degree in which the flexible display element 4 is moved in the direction of A1 may be different from a degree in which the flexible display element 4 is moved in the direction of A2, according to an external condition of the flexible display element 4.

Referring to FIG. 8A, first and second elastic members 110*a* and 110*b* are disposed so as to control the flexible display element 4 so that a degree in which the flexible display element 4 is moved in the direction of A1 is identical or substantially identical to a degree in which the flexible display element 4 is moved in the direction of A2. For example, ends of the wires 130*a* and 130*b* are respectively connected to the first and second rollers 70*a* and 70*b*, and other ends of the wires 130*a* and 130*b* are respectively connected to ends of pistons 120*a* and 120*b*, e.g., piston units. Ends of the first and second elastic members 110*a* and 110*b* are respectively connected to other ends of the pistons 120*a* and 120*b*, and other ends of the first and second elastic members 110*a* and 110*b* are respectively connected to outer wall portions of cylinders 140*a* and 140*b*. A modulus of elasticity of the first elastic member 110*a* is identical or substantially identical to a modulus of elasticity of the second member 110*b*.

Referring to FIGS. 8A and 8B, as the foldable electronic device 100 is changed from the first state to the second state, the first roller 70*a* is rotated in a counterclockwise direction, and the second roller 70*b* is rotated in a clockwise direction. As tension is exerted on the first and second elastic members 110*a* and 110*b* respectively connected to the first and second rollers 70*a* and 70*b*, the first and second elastic members 110*a* and 110*b* apply a similar elastic force to the first and second rollers 70*a* and 70*b*. Thus, a similar tensile force is applied to the second area 4*b* and 4*b'* of the flexible display element 4. Accordingly, the second area 4*b* and the fourth area 4*d* of the flexible display element 4, and the second area 4*b'* and the fifth area 4*e* of the flexible display element 4 may be moved in the directions of A1 and A2, respectively, at a same speed.

As the foldable electronic device 100 is changed from the second state to the first state, the second area 4*b* and the fourth area 4*d* of the flexible display element 4, and the second area 4*b'* and the fifth area 4*e* of the flexible display element 4 respectively move in the directions of A2 and A1. Then, as the first roller 70*a* is rotated in a clockwise direction and the second roller 70*b* is rotated in a counterclockwise direction, a same compressive force is applied to the first elastic member 110*a* and the second elastic member 110*b*. Thus, a same tensile force is applied to the second areas 4*b* and 4*b'* of the flexible display element 4. Accordingly, the second area 4*b* and the fourth area 4*d* of the flexible display element 4, and the second area 4*b'* and the fifth area 4*e* of the flexible display element 4 may be moved in the directions of A2 and A1, respectively, at a same speed.

According to another exemplary embodiment, an angular displacement of the roller 70 may be detected by the sensor 90, and a detection signal detected by the sensor 90 is transmitted to the controller 95. The controller 95 may determine a location of the flexible display element 4 in the first state or in the second state according to the transmitted detection signal. A display area of the flexible display element 4 is determined according to a location of the flexible display element 4 which is determined by the controller 95. One or more sensors 90 may be disposed in the first roller 70*a* or the second roller 70*b*.

According to one or more exemplary embodiments, since a flexible display element of a foldable electronic device may cover a whole display area of the foldable electronic device when the foldable electronic device is folded or unfolded, the foldable electronic device may provide a largest screen possible on the foldable electronic device.

Additionally, according to one or more exemplary embodiments, since a flexible display element of a foldable electronic device is folded at a certain curvature when the foldable electronic device is folded, durability of the foldable electronic device may be enhanced and the foldable electronic device may be easily manufactured.

The use of the terms "a," "an," "the," and the like in the description (especially in the context of the following claims) are to be construed to cover both the singular and the plural. Furthermore, recitation of ranges of values are merely intended to serve as a shorthand method of referring individually to each separate value falling within the range, unless otherwise indicated, and each separate value is incorporated into the specification as if it were individually recited herein. Finally, the steps of all methods described herein can be performed in any suitable order unless otherwise clearly indicated or otherwise clearly contradicted by context. The use of any and all examples, or exemplary language (e.g., "such as") provided herein, is intended merely to better illuminate one or more exemplary embodiments and does not limit the scope of the inventive concept. Numerous modifications and adaptations will be readily apparent to those skilled in this art without departing from the spirit and scope of the inventive concept.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made without departing from the spirit and scope as defined by the following claims and their equivalents.

What is claimed is:

1. A foldable electronic device comprising:
   a first body;
   a second body;

a connection part configured to connect the first body to the second body so that the first body and the second body are rotatable to a first state in which the first and second bodies are unfolded and to a second state in which the first and second bodies overlap each other;

a flexible display element that passes over the connection part and is supported by the first and second bodies;

a roller that is rotatably installed at an end of the first body and fixed to an end of the flexible display element;

a sensor configured to detect an angular displacement of the roller; and a controller configured to receive a detection signal from the sensor, and to determine a display area of the flexible display element in the first state or the second state, wherein the flexible display element is located at an outer circumference of the first body, the second body, and the connection part in the second state, wherein a part of the flexible display element is rolled around the roller in the first state, wherein the controller is further configured to drive the determined display area of the flexible display element, and to not drive an area of the flexible display element rolled around the roller, and wherein one end of the flexible display element including a plurality of protruding parts is fixed to a plurality of concave parts formed on a surface of the roller.

2. The foldable electronic device of claim 1, wherein the other end of the flexible display element is fixed to the second body.

3. The foldable electronic device of claim 1, wherein the connection part comprises:

a first shaft supported so that the first body may be rotated;

a second shaft supported so that the second body may be rotated;

a first gear centered at the first shaft; and a second gear centered at the second shaft, wherein the first gear and the second gear are respectively disposed in the first body and the second body so that the first gear and the second gear to interlock with each other.

4. The foldable electronic device of claim 2, further comprising a slider attached to the flexible display element and installed to slide in the first body in a folding direction.

5. A foldable electronic device comprising:

a first body;

a second body;

a connection part configured to connect the first body to the second body so that the first body and the second body are rotatable into a first state in which the first and second bodies are unfolded and into a second state in which the first and second bodies overlap each other;

a flexible display element that passes over the connection part and is supported by the first and second bodies;

a first roller rotatably installed at an end of the first body and fixed to a first end of the flexible display element;

a second roller rotatably installed at an end of the second body and fixed to a second end of the flexible display element;

sensors configured to detect an angular displacement of the first roller and the second roller; and a controller configured to receive a detection signal from the sensors, and to determine a display area of the flexible display element in the first state or the second state, wherein the flexible display element is located at an outer circumference of the first body, the second body, and the connection part in the second state, wherein a part of the flexible display element is rolled around the first roller and the second roller in the first state, wherein the controller is further configured to drive the determined display area of the flexible display element, and to not drive areas of the flexible display element rolled around the first roller and the second roller, and wherein both ends of the flexible display element including a plurality of protruding parts are fixed to a plurality of concave parts formed on a surface of the first roller and a plurality of concave parts formed on a surface of the second roller, respectively.

6. The foldable electronic device of claim 5, wherein the connection part comprises:

a first shaft supported so that the first body may be rotated;

a second shaft supported so that the second body may be rotated;

a first gear centered at the first shaft; and a second gear centered at the second shaft, wherein the first gear and the second gear are respectively disposed in the first body and the second body so that the first gear and the second gear to interlock with each other.

7. The foldable electronic device of claim 5, further comprising:

a first elastic member configured to apply a first elastic force to the first roller, so that parts of the flexible display element roll around the first roller; and a second elastic member configured to apply a second elastic force to the second roller, so that parts of the flexible display element roll around the second roller.

8. The foldable electronic device of claim 5, wherein a magnitude of the first elastic force is substantially similar to a magnitude of the second elastic force.

9. The foldable electronic device of claim 5, further comprising a slider attached to the flexible display element and installed to slide in the first body and the second body in folding directions.

10. The foldable electronic device of claim 5, wherein the controller is further configured to determine whether the foldable electronic device is in an unfolded state or in a folded state based on the detected angular displacement.

11. The foldable electronic device of claim 10, wherein the controller is further configured to determine that the display area does not comprise, while the foldable electronic device is in the second state, a curved area of the flexible display element spanning between the first body and the second body.

* * * * *